(12) United States Patent
Ramanujam et al.

(10) Patent No.: US 11,454,209 B2
(45) Date of Patent: Sep. 27, 2022

(54) METHOD OF PROVIDING AN EDGE SEAL FOR A ROTOR BLADE ADD-ON

(71) Applicant: Siemens Gamesa Renewable Energy A/S, Brande (DK)

(72) Inventors: Giridhar Ramanujam, Brande (DK); Alex Loeven, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/264,965

(22) PCT Filed: Aug. 23, 2019

(86) PCT No.: PCT/EP2019/072551
§ 371 (c)(1),
(2) Date: Feb. 1, 2021

(87) PCT Pub. No.: WO2020/052939
PCT Pub. Date: Mar. 19, 2020

(65) Prior Publication Data
US 2021/0324829 A1 Oct. 21, 2021

(30) Foreign Application Priority Data

Sep. 10, 2018 (EP) ..................................... 18193531
Aug. 1, 2019 (EP) ..................................... 19189605

(51) Int. Cl.
*B29C 73/02* (2006.01)
*F03D 1/06* (2006.01)
(Continued)

(52) U.S. Cl.
CPC ............ *F03D 1/0675* (2013.01); *B29C 65/52* (2013.01); *B29C 66/532* (2013.01); *B29C 73/02* (2013.01);
(Continued)

(58) Field of Classification Search
CPC ..... B23P 11/025; B23P 2700/02; F01L 1/047; F01L 2001/0471; F01L 2001/0475;
(Continued)

(56) References Cited

U.S. PATENT DOCUMENTS 4,895,491 A     1/1990   Cross et al.
5,375,978 A * 12/1994   Evans ..................... B64C 11/26
                                                                    416/224
(Continued)

FOREIGN PATENT DOCUMENTS

DE     102013210737 A1   12/2014
EP        3144525 A1    3/2017
(Continued)

OTHER PUBLICATIONS

3M Wind Protection Tape 2.0 Application Instructions. Apr. 2017; 5 pages.
(Continued)

*Primary Examiner* — Ryan J. Walters
(74) *Attorney, Agent, or Firm* — Schmeiser, Olsen & Watts LLP

(57) ABSTRACT

A method of providing an edge seal along a longitudinal edge of an add-on part mounted on the outer surface of a rotor blade is provided. The method includes determining a height at the longitudinal edge of the add-on part, choosing a width for the edge seal to be applied on the rotor blade surface, wherein the width of the edge seal is chosen to exceed the height at the longitudinal edge of the add-on part by a factor of at least twenty; and forming the edge seal by applying a sealant material to the rotor blade surface at least in a volume defined by the height at the longitudinal edge of the add-on part and the chosen edge seal width.

10 Claims, 3 Drawing Sheets

(51) Int. Cl.
  *B29C 65/52* (2006.01)
  *B29C 65/00* (2006.01)
  *B29L 31/08* (2006.01)

(52) U.S. Cl.
  CPC ..... *B29L 2031/085* (2013.01); *F05B 2230/80* (2013.01); *F05B 2240/57* (2013.01)

(58) Field of Classification Search
  CPC ........... F01L 2001/0476; F01L 2301/00; F01L 2303/00; F16C 35/063; F16C 2360/18; F16D 1/0858; F16H 53/025; F16B 4/006
  See application file for complete search history.

(56) References Cited

U.S. PATENT DOCUMENTS

| | | | | |
|---|---|---|---|---|
| 5,674,337 | A * | 10/1997 | Coombs | B29C 66/43 156/71 |
| 8,425,196 | B2 * | 4/2013 | Fritz | B29C 65/48 416/229 R |
| 10,907,618 | B2 * | 2/2021 | Kirkegaard | B29C 66/1122 |
| 2010/0028160 | A1 * | 2/2010 | Schaeffer | F01D 5/005 416/224 |
| 2015/0322791 | A1 * | 11/2015 | Flach | F04D 29/18 416/223 R |
| 2017/0016426 | A1 | 1/2017 | Kuhn | |
| 2019/0195202 | A1 * | 6/2019 | Kirkegaard | B29C 66/1122 |

FOREIGN PATENT DOCUMENTS

| | | |
|---|---|---|
| EP | 3536947 A1 | 9/2019 |
| WO | 2016075619 A1 | 5/2016 |
| WO | 2018051153 A1 | 3/2018 |
| WO | 2018060297 A1 | 4/2018 |
| WO | 2018060298 A1 | 4/2018 |
| WO | 2019233715 A1 | 12/2019 |
| WO | 2020069890 A1 | 4/2020 |

OTHER PUBLICATIONS

ELLE Leading Edge Protection Retrofit Solution. 2018; 2 pages.
International Search Report and Written Opinion in corresponding PCT Patent Application No. PCT/EP019/072551 dated Nov. 15, 2019. 14 pages.
Extended European Search Report in corresponding European Patent Application No. 19189605.9 dated Nov. 15, 2019. 7 pages.

* cited by examiner

METHOD OF PROVIDING AN EDGE SEAL FOR A ROTOR BLADE ADD-ON

CROSS-REFERENCE TO RELATED APPLICATIONS

This application is a national stage entry of PCT Application No. PCT/EP2019/072551 having a filing date of Aug. 23, 2019, which claims priority to European Patent Application No. 18193531.3, having a filing date of Sep. 10, 2018, and European Patent Application No. 19189605.9, having a filing date of Aug. 1, 2019, the entire contents of which are hereby incorporated by reference.

FIELD OF TECHNOLOGY

The following describes a method of providing an edge seal for a rotor blade add-on.

BACKGROUND

The aerodynamic performance of wind turbine rotor blades is highly sensitive to surface imperfections, especially to those that lie in close proximity to the leading edge of the rotor blade. This presents a challenge when a step or an obstacle is present on the rotor blade surface, for example following the application of a leading edge protection (LEP) cover and/or a vortex generator (VG) panel, a trailing edge (TE) panel, etc. LEP covers are also referred to as erosion protective covers or LEP shells.

A sharp step may be present at the edges of a panel or cover attached to the rotor blade. Such an abrupt height difference causes the air flow to transition from laminar to turbulent, which will adversely impact the annual energy production (AEP) of the wind turbine and may also contribute to wind turbine noise.

It is known from the prior art to grind the edge of an already-mounted add-on into a ramp or slope in order to reduce the AEP impact. However, such a grinding procedure is time-consuming and cost-intensive. In addition, it is difficult to obtain a uniform edge along the entire edge of the add-on, and there is a risk of grinding into the rotor blade itself. The grinding procedure may also be difficult to perform, since the material of the add-on may be flexible and accordingly difficult to grind.

Another way of reducing turbulence arising from a step along the edge of an add-on is to manufacture the add-on with a thin edge. However, mounting an add-on such as a LEP cover with a long thin edge may result in wrinkling along the edge, which contributes to non-conformance cost and reduces aerodynamic performance.

In another approach, an add-on such as an LEP shell may be manufactured to fit into a built-in recess on the blade surface. However, this approach is associated with strict requirements regarding production tolerances and quality, and significantly increases manufacturing costs while also being more prone to defects.

SUMMARY

It is therefore an aspect of the present invention to provide a way of overcoming the negative influence of an add-on to the aerodynamic performance of a rotor blade.

This aspect is achieved by the method of forming an edge seal along a longitudinal edge of an add-on part mounted on the outer surface of a rotor blade, and by the wind turbine rotor blade.

The embodiment of the present invention describes a method of providing an edge seal along a longitudinal edge of an add-on part mounted on the outer surface of a rotor blade. The inventive method comprises the steps of determining a height at the longitudinal edge of the add-on part; choosing a width for the edge seal to be applied onto the surface of the rotor blade, wherein the edge seal width is chosen to exceed the height at the longitudinal edge of the add-on part by a factor of at least twenty (i.e. the ratio of rotor blade edge seal width to add-on height is at least 20:1); and forming the edge seal by applying a sealant material at least in a volume defined by the height at the longitudinal edge of the add-on part and the determined blade surface edge seal width. The term "edge seal width" shall be understood to mean the width of the edge seal that is formed on the rotor blade surface, commencing along the longitudinal edge of the add-on part, and extending towards an outer seal edge that is generally parallel to the longitudinal edge of the add-on part.

In the context of the embodiment of the present invention, the longitudinal edge at the add-on part may be assumed to have the appearance of an abrupt step. There is no need to manufacture the add-on to have a progressively thinner longitudinal edge when it is to be mounted to a rotor blade using the inventive method, so that manufacture of such add-ons can be favourably economical. Since the add-on part is generally attached or bonded to the rotor blade in some way, for example by an adhesive bonding layer, the height at the longitudinal edge of the add-on part may be assumed to comprise the height of the add-on at that longitudinal edge, as well as the height of any adhesive layer for bonding the add-on to the rotor blade.

The edge seal width may be understood to extend outward from the longitudinal edge of the add-on. Since the edge seal width is significantly larger than the add-on height, the improved edge seal favorably reduces or even eliminates AEP losses associated with the add-on. The edge seal obtained by the inventive method also significantly reduces noise generated by the rotor blade when turning, compared to a rotor blade not provided with such edge sealing along a part such as an LEP cover. This is primarily because the seal width obtained using the inventive method is significantly wider than any known type of edge seal. For example, it is known to apply a sealant along the edge of an add-on part or to a leading-edge protection tape, to a width of a few millimetres, but the laminar airflow over such narrow edge seals has been observed to break down and to develop turbulence.

The inventive method may be used during manufacturing of a wind turbine rotor blade and also when repairing or upgrading an already installed rotor blade. The inventive method is equally applicable to existing blade add-ons, for which the contribution to AEP will improve when provided with the inventive edge sealing.

According to the embodiment of the present invention, the wind turbine rotor blade comprises at least one add-on part mounted to the outer surface of the rotor blade, and such an "extended" edge seal, as described above, formed along at least one longitudinal edge of the add-on part.

In the following, without restricting the embodiment of the present invention in any way, the term "add-on" may be understood to mean any of a protective cover, a plate or panel attached to the surface of the blade, especially along the longitudinal extension of the blade. The terms "edge sealing" and "edge seal" may be used interchangeably.

A sealing agent or an adhesive is used to form the edge seal along one or more edges of the add-on, either with or without an overlap as will be explained in the following. The terms "sealant material", "edge sealer" and "sealing agent" may be used to refer to such an adhesive. The seal is formed using a liquid sealant that solidifies some time after application and which, when liquid, has a specific rheology that combines a desired sag resistance with a desired flowability. The solidified sealant is flexible, abrasion-resistant, and adheres well to the surface to which it is applied. The sealant may be a hot-melt adhesive that becomes firm upon cooling, for example. Alternatively, a sealant that becomes firm by a chemical curing process may be preferred. Exemplary materials may be epoxy, polyurethane, polyuria, silicone, silane modified polymers (SMP), methylmethacrylate (MMA), etc., chosen in view of the desired properties of sag resistance and flowability as indicated above. For example, a sealant material may be chosen to have a specific adhesive viscosity offering a good balance between sag resistance and flowability, as well as a favorably high degree of flexibility in its cured state. The integrity of an edge seal formed along the longitudinal edges of an LEP using such a material will not suffer from repeated torsional bending of the rotor blade.

The inventive method of aerodynamically optimizing the edges of an add-on is not limited to aerodynamic devices such as LEP covers. The add-on may be a plate comprising sensors, e.g. a flexible plate that conforms to the curved surface of the rotor blade. The fixation of such a sensor plate to the rotor blade surface can benefit from the sealing concept of the present invention, achieving improvements in respect of AEP. Such a plate may be attached to the rotor blade surface at any position between the leading edge and trailing edge of the rotor blade, and may be mounted on the suction side or the pressure side of the rotor blade. An edge seal is formed along nay longitudinal edge of such a plate, using the inventive method. In this way, neither the upwind or windward edge (i.e. the edge that is closer to rotor blade leading edge) nor the downwind edge (the edge that is closer to the rotor blade trailing edge) of such a plate will adversely affect the laminar airflow over the rotor blade surface.

As an example, the edge step height of an add-on may be 0.7 mm. The edge step height of an add-on is the sum of the thickness at the outer edge of the add-on plus the thickness of any adhesive or bonding layer used to attach the add-on to the rotor blade. In this case, the minimum width of the edge sealing for this add-on is 14 mm. For an edge step height of 1.0 mm, the minimum width of the edge sealing is 20 mm.

The ratio of edge seal width to step height can vary between 20:1 to 100:1. For the example edge step height range of 0.5 mm-1.5 mm, the edge seal would be at least 10 mm wide, and up to 150 mm wide. Such relatively wide edge seals for rotor blade add-on parts have been observed (in wind tunnel tests) to result in an improved aerodynamic behavior.

A further exemplary embodiment of the present invention is based on the insight that the laminar nature of the airflow over the rotor blade surface can be preserved by forming the edge seal over the longitudinal edge of the add-on, i.e. by having the edge seal "overlap" the outer surfaces of both the add-on and the rotor blade. In a further exemplary embodiment of the present invention, therefore, the method comprises a step of determining an overlap width for the edge seal, in a region of the add-on surface next to its longitudinal edge. The term "overlap width" shall be understood to mean the width of the edge seal portion that extends onto the surface of the add-on. The overlap width is determined on the basis of the add-on height.

The step of forming the edge seal then comprises applying the sealant material also onto an overlap region of the add-on part. The overlap of the edge seal can advantageously form a smooth layer over the edge of the add-on.

In the inventive method, the edge seal width and overlap width for an edge seal are "tuned" to a specific add-on in order to prevent or at least significantly delay the onset of flow transition from laminar to turbulent on the surface of the blade behind the edge of the add-on, i.e. downwind of the add-on. The extent (i.e. width) of the edge sealing and the extent of any overlap will be governed by the height of the edge step at the longitudinal edge of the add-on.

The ratio of overlap width to step height can vary from 10:1 to 50:1. For the example edge step height of 0.5 mm, the overlap width would be 5 mm-25 mm wide. For an edge step height of 1.5 mm, the edge seal width would be 15-75 mm wide. The recommended ratios described above are significantly larger than typically used by solutions known in the art. The maximum possible width or extent of an edge sealing may also be determined or limited by a curvature of the rotor blade.

The edge sealing proposed herein may be achieved by using a sealing agent or adhesive with sufficiently low viscosity, to be fluid enough to flow into any gaps and surface crevices formed during application of the add-on, and to ensure a smooth finish. However, since the viscosity of the adhesive will determine the minimum height of the edge seal along its outer boundaries, the sealant material is also chosen such that a smooth transition to the blade surface is assured.

Whether or not the sealant material is formed to overlap the add-on edge or step, the sealant material may be applied using a tool set comprising a number of spatulas with different properties. In an exemplary embodiment of the present invention, the step of forming an edge seal comprises a step of depositing sealant material at least onto the surface of the rotor blade alongside the longitudinal edge of the add-on part. Then, a preliminary spatula is used to spread the sealant material in a region bounded by the longitudinal edge of the add-on part and the chosen edge seal width. The preliminary tool has a flexibility and shape that facilitates the initial spreading of the sealant. In a subsequent step, a refining spatula is used to refine the shape of the sealant spread by the preliminary tool. The refining tool has a lower hardness than the preliminary tool.

The inventive method can include a step of delimiting the area of the intended edge seal using smooth, thin masking tape. One tape may extend along the outer edge of the intended edge seal, at a distance outward from the edge step. This distance is at least 20 times larger than the edge step height. The thickness of the tape is as small as possible, at most 0.2 mm. The other boundary of the edge seal may be defined by the edge step. Alternatively, if an overlap is to be formed over the edge step, a second tape may be applied to the surface of the add-on, parallel to the longitudinal edge of the add-on. The sealant is then applied within these bounds. The sealant can initially be roughly deposited on the rotor blade (and add-on), for example in the form of a bead from a dispenser nozzle, or by spraying. The roughly applied sealant is then spread using a preliminary shaping tool, for example a flexible toothed spatula. This can be done by guiding the toothed spatula in the longitudinal direction of the rotor blade surface, between the edge seal bounds. After this preliminary step is complete, the tape or tapes are removed. The still-liquid sealant is then smoothed to its final shape by drawing a softer, flexible spatula over the spread sealant. This refining or smoothing step with the second tool serves to further decrease the height of the "wedge" of the edge seal between the edge step and the outer boundary of the edge seal. The second flexible spatula is made of a material such as silicone to ensure a relatively low Shore hardness, for example 50±10.

For large edge steps, a filler material may be used to augment the edge seal. In such an exemplary embodiment of the present invention, filler material is applied along the edge of the add-on to reduce the edge step initially, i.e. to form a compact wedge or slope extending outward from the add-on edge. The sealant material is then applied over the filler. The filler material may have a higher viscosity than the sealant material to facilitate an easy build-up of the filler or bottom layer. The extent or width of the filler will be less than the blade surface edge seal width so that a uniform layer of sealant material can be applied over the filler to achieve a smooth transition to the rotor blade surface. The volume occupied by the filler material may be less than half the intended volume of the edge seal.

Advantageously, the inventive edge seal reduces the negative impact of steps or other obstacles on the aerodynamic performance of a rotor blade. By significantly reducing or even eliminating the negative influence of the abrupt edges of an add-on on the rotor blade aerodynamic performance, the inventive edge seal can ensure that an add-on is "AEP-neutral".

The inventive method also makes it possible to implement add-ons such as LEP shells, LEP covers etc., with a higher edge thickness. This in turn is associated with cost reduction, since the formation of a thin edge is a cost-driving factor in the manufacture of add-ons such as LEP covers and shells. The edge sealing method described above contributes to the aerodynamic performance improvement of the LEP solution. The inventive edge sealing indirectly enables the use of a shell with a thicker edge, and thereby contributes to the reduction of manufacturing costs and can assist in avoiding penalties such as non-conformance costs.

BRIEF DESCRIPTION

Some of the embodiments will be described in detail, with reference to the following figures, wherein like designations denote like members, wherein:

FIG. 1 depicts an embodiment of the edge seal applied to the longitudinal edge of a rotor blade add-on;

DETAILED DESCRIPTION

In the diagrams, like numbers refer to like objects throughout. Objects in the diagrams are not necessarily drawn to scale.

Figure 1:
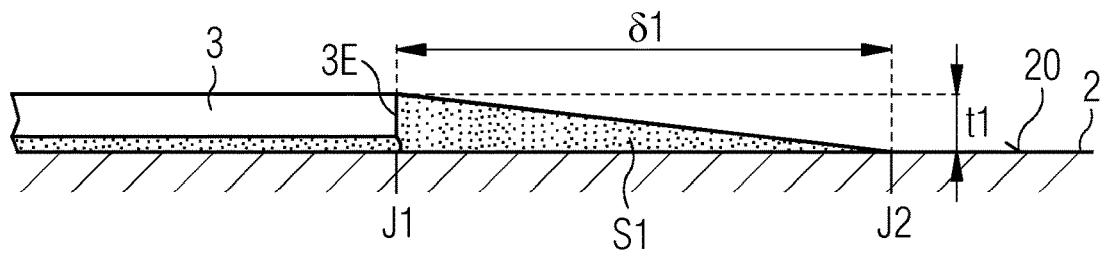

FIG. 1 shows an embodiment of the inventive edge seal S1 applied to an add-on 3, which can be any of a LEP cover, a shell, a TE cover, a VG panel, a TE panel, a sensor panel, etc. The add-on 3 is attached to the outer surface 20 of the rotor blade 2 by an adhesive bonding layer 33. For the purpose of discussion, the adhesive layer 33 may be regarded as an element of the add-on 3. The height t1 of the add-on 3 at its edge 3E is the sum of the thickness of the add-on 3 and the thickness of the adhesive layer 33. The add-on edge 3E may be assumed to run in a longitudinal direction of the rotor blade 2. The diagram clearly shows the "step" shape at the edge 3E of the add-on 3. Using the inventive method, an edge seal S1 is formed along the add-on edge 3E. The edge seal S1 commences at a first point J1 at the add-on edge 3E and extends to a second point J2, whereby the height of the seal S1 gradually decreases from a maximum at point J1 to a minimum at point J2. The ratio $\delta 1:t1$ is at least 20:1. The volume of the edge seal S1 in this case is the cross-sectional area of the edge seal S1, i.e. $(t1 \times \delta 1)/2$, multiplied by the length of the seal S1, e.g. the length of the longitudinal edge 3E of the add-on 3.

Figure 2:
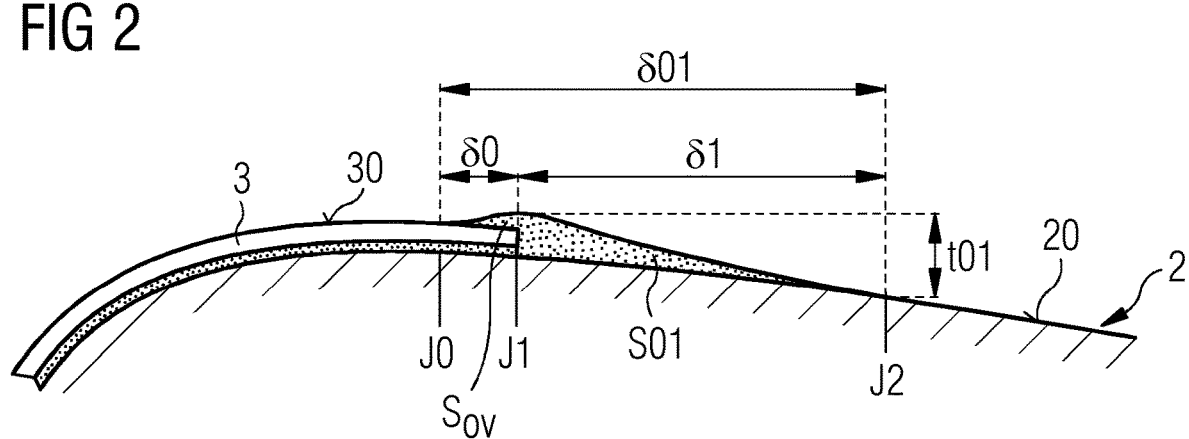
FIG. 2 depicts a further embodiment of the edge seal.

FIG. 2 shows a further embodiment of the inventive edge seal. Here, the edge seal S01 is applied to a longitudinal edge 3E of an add-on 3, in this case an LEP cover mounted about the leading edge of a rotor blade 2. In this exemplary embodiment, the edge seal S01 overlaps the longitudinal edge 3E of the add-on 3, i.e. the edge seal S01 commences at point J0 and extends to point J2. The total width $\delta 01$ of the edge seal S01 is therefore the width $\delta 0$ of the overlap $S_{OV}$ extending from point J0 to point J1, and the remaining edge seal width M extending from point J1 to point J2. In this embodiment, the height of the seal S01 gradually increases from a minimum at point J0 to a maximum at point J0, and gradually decreases from the maximum at point J1 to a minimum at point J2. The height of the seal S01 at its maximum may exceed the height of the add-on edge 3E by up to 2.0 mm, depending on the overlap width $\delta 0$ and/or on the edge seal width M between point J1 and point J2. This height is based on the controlled layer thickness of the sealant or adhesive applied using a tool such as a spatula.

Figure 3:
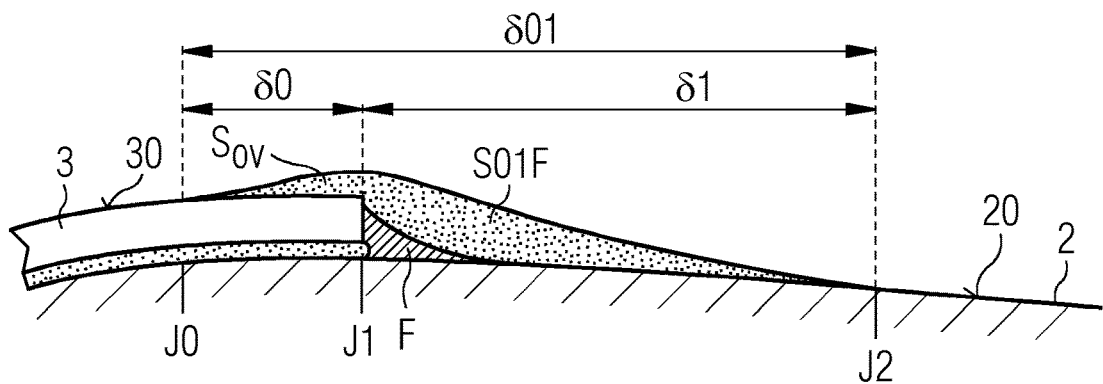
FIG. 3 depicts a further embodiment of the edge seal.

FIG. 3 shows a further embodiment of the inventive edge seal. Similarly to the edge seal S01 of FIG. 2, the edge seal S01F in this case extends over a filler F that is first applied along the longitudinal add-on edge 3E. The filler F may be a quick-setting adhesive and/or a high-viscosity adhesive. The filler F can be applied to form a wedge with straight sides that are shorter than the height of the add-on 3. In a subsequent step, sealant material is applied over the cured or hardened filler F such that the resulting edge seal S01F overlaps the longitudinal edge 3E of the add-on 3, commencing at point J0 and extending to point J2. In this case also, the total width $\delta 01$ of the edge seal S01F is measured from point J0 to point J2. As described in FIG. 2 above, the height of the seal S01F gradually increases from a minimum at point J0 to a maximum at point J0, and gradually decreases from the maximum at point J1 to a minimum at point J2. The filler F shown here could also be used in the embodiment of FIG. 1.

Figure 4:
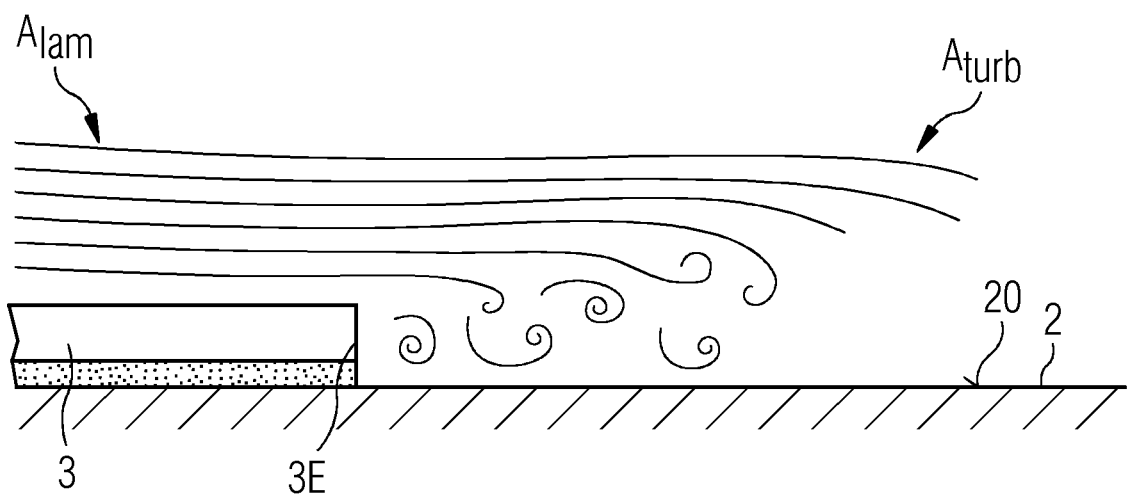
FIG. 4 depicts an add-on attached to a rotor blade surface as known from the prior art.

FIG. 4 shows an add-on 3 attached to a rotor blade surface 20 in a manner known from the prior art. The add-on 3 may be attached using an adhesive 33 as explained above. A longitudinal edge 3E of the add-on 3 forms an abrupt or distinct step, which can cause a laminar airflow $A_{lam}$ to break up, resulting in turbulence $A_{turb}$ downwind of the step 3E. Such turbulence $A_{turb}$ reduces the aerodynamic performance of the rotor blade 2, and accordingly lowers the AEP of the wind turbine.

Figure 5:
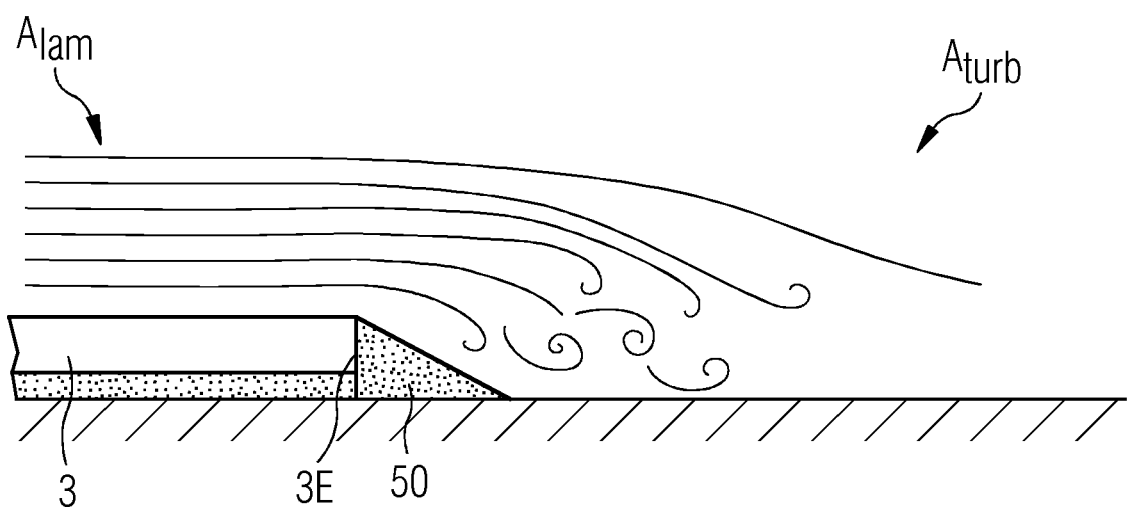
FIG. 5 depicts another add-on attached to a rotor blade surface as known from the prior art.

FIG. 5 shows another prior art approach to securing an add-on 3 to a rotor blade surface 20. Here, the step 3E formed by the longitudinal edge 3E of the add-on 3 is made less abrupt by a seal 50 applied along the edge 3E. The width of such a prior art edge seal 50 is generally only between 2-5 mm. The incoming laminar airflow $A_{lam}$ over the rotor blade 2 is not affected as severely as shown in FIG. 4 above, but even the less abrupt step presented by the seal 50 is insufficient to preserve the laminar nature of the airflow, resulting in turbulence $A_{turb}$ downwind of the seal 50, so that this approach also shows a negative effect on the aerodynamic performance of the rotor blade 2 and a corresponding reduction in the wind turbine AEP.

Figure 6:
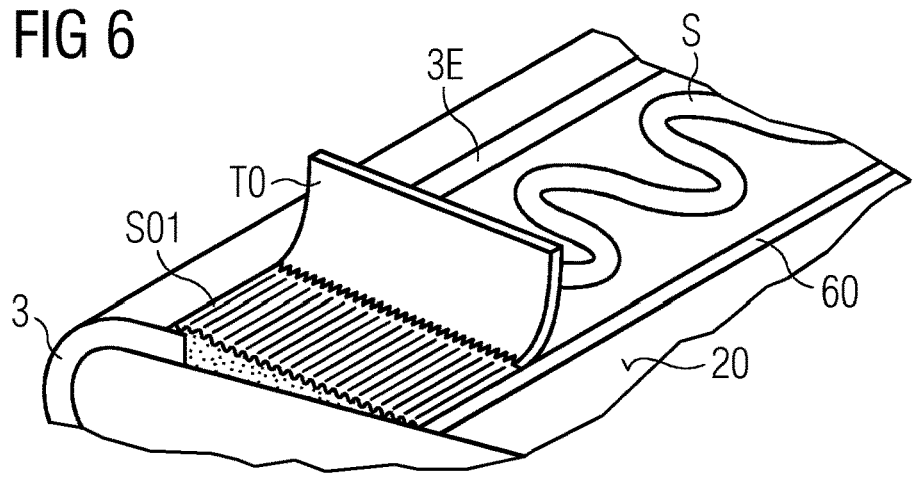
FIG. 6 depicts templates used in the method.
Figure 7:
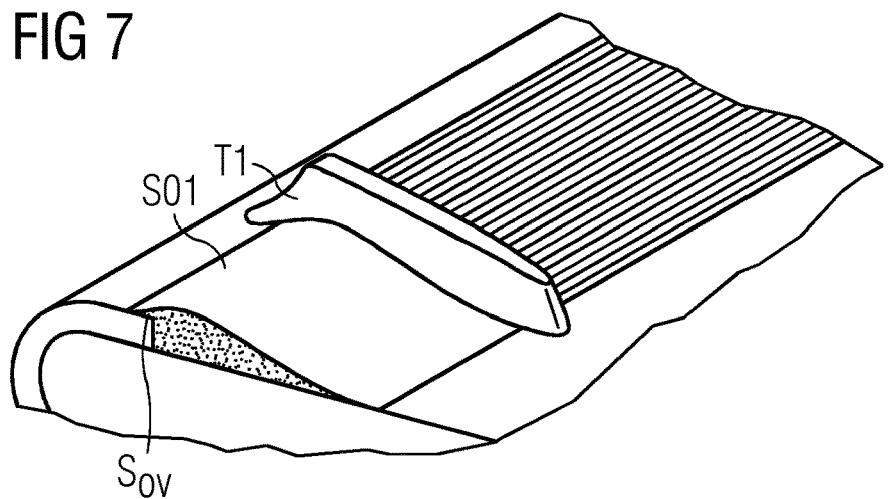
FIG. 7 depicts templates used in the method.

FIGS. 6 and 7 show stages in forming an edge seal S01 using the inventive method. The sealant material S is roughly distributed along an edge 3E of the add-on 3, in this case a leading edge protector. With a preliminary tool T0, the roughly applied sealant S is spread to fill a volume between the long edge 3E of the add-on 3 and a mask tape 60. The mask tape is smooth with a thickness of at most 0.2 mm. Here, the preliminary tool T0 is a flexible toothed spatula. Its flexibility is such that it can be bent in both axial directions to facilitate spreading of the sealant S. Then, using a refining tool T1, the still-soft sealant S is shaped as desired, in this case to form an overlap Soy alongside the long edge 3E of the add-on 3. The mask tape 60 can be removed after this step. In a final step, the refining tool T1 is again used to further optimize the shape of the edge seal S01. This refining tool T1 is softer than the preliminary tool T0, for example with a Shore hardness of 40-60, so that it can be curved as desired during spreading of the sealant in order to achieve the desired edge seal profile shape.

Figure 8:
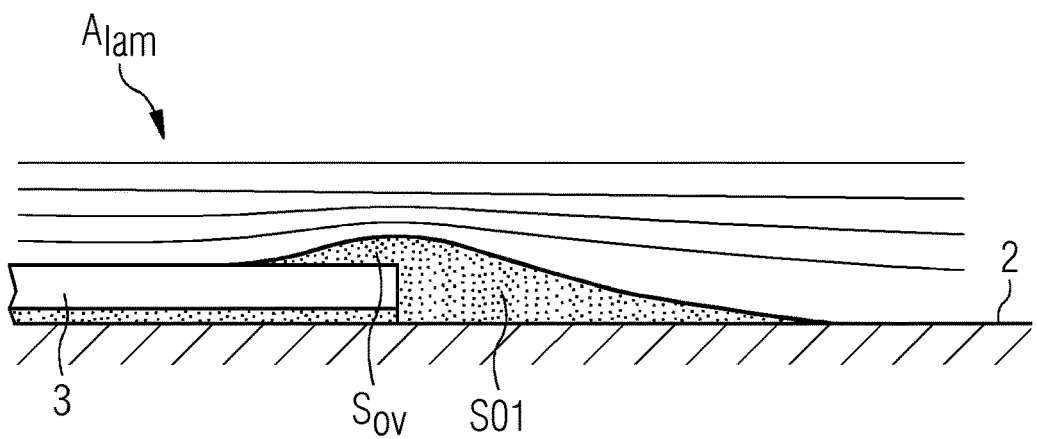
FIG. 8 depicts laminar airflow over an edge seal formed using the inventive method.

FIG. 8 shows airflow over an add-on that has been given an edge seal S1 using the inventive method. The diagram shows that the laminar nature of the airflow $A_{lam}$ is maintained due to the smooth extended edge seal S1.

Although the embodiment of the present invention has been disclosed in the form of the exemplary embodiments and variations thereon, it will be understood that numerous additional modifications and variations could be made thereto without departing from the scope of the present invention.

For the sake of clarity, it is to be understood that the use of "a" or "an" throughout this application does not exclude a plurality, and "comprising" does not exclude other steps or elements.

What is claimed:

1. A method of providing an edge seal along a longitudinal edge of an add-on part mounted on an outer surface of a rotor blade, the method comprising:
   determining a height at the longitudinal edge of the add-on part;
   choosing a width for the edge seal to be applied on the rotor blade surface, wherein the width of the edge seal is chosen to exceed the height at the longitudinal edge of the add-on part by a factor of at least twenty; and
   forming the edge seal over the longitudinal edge of the add-on part by applying a sealant material to a portion of the add-on part and to the rotor blade surface adjacent to the longitudinal edge of the add-on part so that the edge seal overlaps the portion of the add-on part and the rotor blade surface.

2. The method according to claim 1, wherein the width is at least 12 mm.

3. The method according to claim 1, wherein a ratio of edge seal width to height at the longitudinal edge of the add-on part is at most 100:1.

4. The method according to claim 1, further comprising determining a width of an edge seal overlap in an overlap region adjacent to the longitudinal edge of the add-on part, wherein the overlap width is determined on a basis of the height at the longitudinal edge of the add-on part.

5. The method according to claim 4, wherein a ratio of overlap width to height at the longitudinal edge is in the range of 10:1 to 50:1.

6. The method according to claim 4, wherein the sealant material is applied over the overlap width and edge seal width such that the height of the edge seal exceeds the height at the longitudinal edge of the add-on part.

7. The method according to claim 1, wherein the forming the edge seal is preceded by applying a filler material along the longitudinal edge of the add-on part, whereby a volume occupied by the filler material is less than an intended volume of the edge seal.

8. The method according to claim 1, wherein the sealant material is applied using a template shaped to define a desired smooth transition from the longitudinal edge of the add-on part to the rotor blade surface.

9. The method according to claim 8, wherein the template is shaped to distribute the sealant material in the overlap region of the add-on part.

10. The method according to claim 1, wherein the forming the edge seal comprises:
    depositing sealant material at least onto the portion of the add-on part and the surface of the rotor blade alongside the longitudinal edge of the add-on part;
    using a preliminary tool to spread the sealant material in a region delimited by the longitudinal edge of the add-on part and the width; and
    using a refining tool to refine a shape of the sealant material spread by the preliminary tool, the refining tool having a lower hardness than the preliminary tool and a profile based on a desired edge seal shape.

* * * * *